US008761198B2

(12) United States Patent
Leroy et al.

(10) Patent No.: US 8,761,198 B2
(45) Date of Patent: Jun. 24, 2014

(54) TELECOMMUNICATION/ACCESS SYSTEM FOR DEALING WITH DIFFERENT ADDRESS LENGTHS

(75) Inventors: Suresh Andre Jean-Marie Leroy, Vlimmeren (BE); Lieve Maria Marcella Rosemarijn Bos, Vlimmeren (BE)

(73) Assignee: Alcatel Lucent, Paris (FR)

( * ) Notice: Subject to any disclaimer, the term of this patent is extended or adjusted under 35 U.S.C. 154(b) by 1559 days.

(21) Appl. No.: 10/350,080

(22) Filed: Jan. 24, 2003

(65) Prior Publication Data
US 2003/0152090 A1 Aug. 14, 2003

(30) Foreign Application Priority Data
Feb. 12, 2002 (EP) .................................... 02290340

(51) Int. Cl.
*H04L 12/28* (2006.01)
*H04J 3/16* (2006.01)
*H04J 3/24* (2006.01)

(52) U.S. Cl.
USPC ........................... 370/466; 370/401; 370/474

(58) Field of Classification Search
USPC ................................................ 370/401, 466
See application file for complete search history.

(56) References Cited

U.S. PATENT DOCUMENTS

| 6,038,233 A | 3/2000 | Hamamoto et al. | |
|---|---|---|---|
| 6,118,784 A * | 9/2000 | Tsuchiya et al. | 370/401 |
| 6,822,957 B1 * | 11/2004 | Schuster et al. | 370/389 |
| 7,116,681 B1 * | 10/2006 | Hovell et al. | 370/466 |
| 7,450,560 B1 * | 11/2008 | Grabelsky et al. | 370/352 |
| 2004/0001509 A1 * | 1/2004 | Zhang et al. | 370/466 |
| 2011/0292850 A1 * | 12/2011 | Oishi et al. | 370/310 |

OTHER PUBLICATIONS

Tsirtsis and Srisuresh: "Network Address Translation-Protocol Translation (NAT-PT)" Feb. 1, 2000, XP002215395, pp. 1-21.

* cited by examiner

*Primary Examiner* — Jutai Kao
(74) *Attorney, Agent, or Firm* — Wolff & Samson (57) ABSTRACT

Telecommunication systems should be able to handle different protocols. Thereto, with a first protocol being Internet Protocol v6 using 128-bit addresses of a first kind and with a second protocol being Internet Protocol v4 using 32-bit addresses of a second kind, an access system is provided with a generating section for, in response to an address of one kind, generating a corresponding address of an other kind for a terminal-to-terminal communication and independently of which terminal has initiated said terminal-to-terminal communication. For a set-up phase, a replacing section replaces addresses of a second kind by corresponding addresses of a first kind, and an adding section adds, in addition to addresses of a first kind, corresponding addresses of a second kind, in set-up messages. For a communication phase, activating sections activate translating sections, which translating sections translate addresses of one kind into addresses of an other kind, in packets.

2 Claims, 3 Drawing Sheets

TELECOMMUNICATION/ACCESS SYSTEM FOR DEALING WITH DIFFERENT ADDRESS LENGTHS

BACKGROUND OF THE INVENTION

1. Field of the Invention

The invention relates to a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind.

The invention also relates to an access system for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind, and to a server for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind, and to a first translating section for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind, and to a second translating section for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind, and to a method for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind, and to a processor program product for use in a telecommunication system comprising a first access system for first communication with a first terminal and a second access system coupled to said first access system for second communication with a second terminal, which first communication comprises first packets comprising addresses of a first kind and which second communication comprises either first packets comprising addresses of a first kind or second packets comprising addresses of a second kind.

Such a telecommunication system is for example a telecommunication network, with said first access system for example being a public access network and with said second access network for example being a private access network.

2. Description of the Related Art

A prior art telecommunication system is generally known, with said addresses of a first kind defining public addresses used in the first communication based upon the exchanging of first packets and with said addresses of a second kind defining private addresses used in the second communication based upon the exchanging of second packets. These addresses all have the same length, and need to pass, in a set-up phase as well as in a communication phase, a gateway located between said access systems.

The known telecommunication system is disadvantageous, inter alia, due to not being able to handle addresses with different lengths, and/or due to needing a gateway for the set-up phase as well as for the communication phase.

It is an object of the invention, inter alia, of providing a telecommunication system as defined in the preamble which can handle different addresses with different lengths, without the set-up phase getting inefficient.

SUMMARY OF THE INVENTION

The telecommunication system according to the invention is characterised in that said first communication is in accordance with a first protocol and said second communication is in accordance with said first protocol or a second protocol, with addresses of a first kind having a first length and with addresses of a second kind having a second length smaller than said first length, and with said first access system comprising a generating section for, in response to an address of one kind, generating a corresponding address of an other kind for a terminal-to-terminal communication comprising said first and second communication and independently of which terminal has initiated said terminal-to-terminal communication.

By introducing said generating section in said first access system, in other words in that part of the telecommunication system which deals with the most sophisticated (first) terminal of the two terminals involved (the other second terminal is less sophisticated or at most similarly sophisticated—here both options are still open), due to this first terminal communicating via the first packets comprising more sophisticated, longer addresses (of a first kind) based upon the first, more sophisticated protocol and due to the second terminal communicating either via the first packets comprising more sophisticated, longer addresses (of a first kind) based upon the first, more sophisticated protocol or via the second packets comprising less sophisticated, shorter addresses (of a second kind) based upon the second, less sophisticated protocol (here both options are still open), the telecommunication system according to the invention can handle the entire set-up phase as well as the entire communication phase from one location (the first access system), due to, at this location, a relationship between said addresses of said first and second kind being available, independently of which terminal has initiated said terminal-to-terminal communication. As a result, for the set-up phase, a gateway no longer is necessary, and both access systems can operate with the highest speed and/or with optimal efficiency.

The invention is based upon an insight, inter alia, that when a relationship between addresses having the same length can be defined, it should also be possible to define a relationship between addresses having different lengths, and is based upon a basic idea, inter alia, that such a relationship should be defined at a location situated closest to the most sophisticated (first) terminal of the two terminals involved (in other words closest to the terminal communicating in accordance with the most sophisticated protocol).

The invention solves the problem, inter alia, of providing a telecommunication system as defined in the preamble which can handle different addresses with different lengths (of different kinds), with addresses of a first kind being used for the first communication in accordance with the first protocol and with addresses of the second kind being used for the second communication in accordance with the second protocol, and without requiring, in the set-up phase, a gateway. Usually, in the communication phase, a (kind of) gateway will still be required.

It should be noted that said first and second protocols can be two different protocols, or can be different versions of the same protocol. The fact that the first communication comprises first packets comprising addresses of a first kind and that the second communication comprises either first packets comprising addresses of a first kind or second packets comprising addresses of a second kind (here both options are still open) can correspond with one or both terminals generating these packets, or can correspond with further units (like for example local switches, routers, bridges, servers, and/or base stations, nodes etc.) taking care of a conversion of terminal signals into packets. Said terminals can be fixed terminals, cordless terminals, mobile terminals, satellite terminals etc.

It should further be noted that a gateway for generating, in response to an address of one kind, a corresponding address of an other kind, is known from "Network Address Translation—Protocol Translation (NAT-PT)", Network Working Group—Request for Comments: 2766—Category: Standards Track, G. Tsirtsis, B T, P. Srisuresh, Campio Communications, February 2000. However, such a gateway reduces the efficiency of the set-up phase a lot. The invention comprises a solution, which does not require a gateway for the set-up phase, with said generating section being located in said first access system only, and not in said second access system (for the case where said first terminal is most sophisticated and where said second terminal is less sophisticated), independently of which terminal has initiated said terminal-to-terminal communication.

A first embodiment of the telecommunication system according to the invention is advantageous in that, for a set-up phase, said first access system comprises a replacing section coupled to said generating section for, in response to a receival of a set-up message comprising an address of a second kind and originating from said second terminal, replacing said address of a second kind by a corresponding address of a first kind.

By introducing said replacing section, set-up messages originating from the second, less sophisticated terminal can now be used for setting up a communication from the second, less sophisticated terminal to the first, more sophisticated terminal. When setting up a communication from the second, less sophisticated terminal to the first terminal, at the moment of arrival of said set-up message at said first access system, the second terminal is identified. And each (first/second) access system has knowledge about the (first/second) terminals coupled to this (first/second) access system. So, at said moment of arrival, everything is clear, the first access system has identified the second terminal and already knows the first terminal.

A second embodiment of the telecommunication system according to the invention is advantageous in that said first access system comprises an activating section for activating a first translating section for a communication phase.

By introducing said activating section, for the communication phase following said set-up phase, said first translating section can be activated for a more fluent communication.

A third embodiment of the telecommunication system according to the invention is advantageous in that, for a communication phase, said first access system comprises said first translating section coupled to said generating section for, in response to a receival of a second packet, translating an address of a second kind into an address of a first kind.

By translating addresses of a second kind into addresses of a first kind, said second packets originating from said second terminal can now be forwarded to said first terminal.

A fourth embodiment of the telecommunication system according to the invention is advantageous in that, for a set-up phase, said first access system comprises an adding section coupled to said generating section for, in response to a receival of a set-up message comprising an address of a first kind and originating from said first terminal, adding, in addition to said address of a first kind, a corresponding address of a second kind, with an amended set-up message comprising both said address of said first kind and said address of said second kind to be sent to said second access system.

By introducing said adding section, set-up messages originating from the first, more sophisticated terminal can now be used for setting up a communication from the first, more sophisticated terminal to the second, still unknown terminal. When setting up a communication from the first, more sophisticated terminal to the second terminal, at the moment of arrival of said set-up message at said first access system, the first terminal is identified. But each (first/second) access system has already knowledge about the (first/second) terminals coupled to this (first/second) access system. So, at said moment of arrival, not everything is clear yet, the first access system has just identified the already known first terminal, but does not yet know enough about the second terminal.

A fifth embodiment of the telecommunication system according to the invention is advantageous in that said first access system comprises an activating section for, in response to a response message comprising said address of said second kind and originating from said second access system, activating a second translating section for a communication phase.

By introducing said activating section, for the communication phase following said set-up phase, said second translating section can be activated for a more fluent communication. Contrary to the activation of the first translating section, the activation of the second translating section can only be done after said second terminal has been identified by said first access system. This identification is done through said response message.

A sixth embodiment of the telecommunication system according to the invention is advantageous in that, for a communication phase, said first access system comprises said second translating section coupled to said generating section for, in response to a receival of a first packet, translating an address of a first kind into an address of a second kind.

By translating addresses of a first kind into addresses of a second kind, said first packets originating from said first terminal can now be forwarded to said second terminal.

A seventh embodiment of the telecommunication system according to the invention is advantageous in that said first and second protocol respectively are more recent and less recent versions respectively of an Internet Protocol, with said first length being 128 bits and with said second length being 32 bits, with said generating section, replacing section, adding section and activation sections forming part of a Session Initiation Protocol Server, and with said first and second translating sections forming part of a gateway.

Said more recent version for example corresponds with IPv6, and said less recent version for example corresponds with IPv4. Said sections can be 100% hardware, 100% software or a mixture of both running via one or more processors of said Session Initiation Protocol (SIP) Server and/or of said gateway.

Embodiments of the access system according to the invention, of the server according to the invention, of the first and second translating section according to the invention, of the method according to the invention and of the processor program product according to the invention correspond with the embodiments of the telecommunication system according to the invention.

BRIEF DESCRIPTION OF THE DRAWINGS

These and other aspects of the invention will be apparent from and elucidated with reference to the embodiments(s) described hereinafter with reference to the drawings in which.

DETAILED DESCRIPTION OF THE INVENTION

Figure 1:
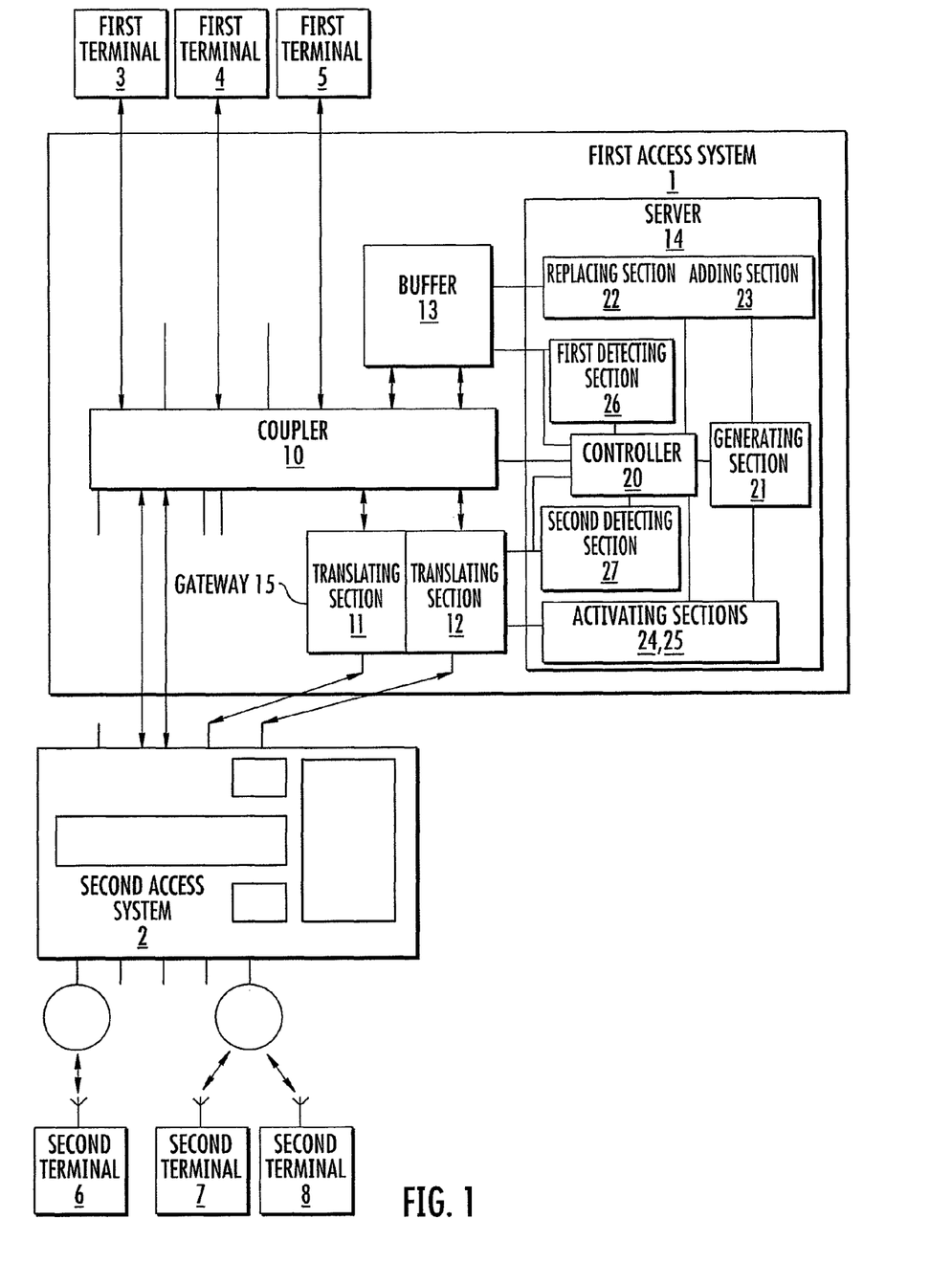
FIG. 1 illustrates in block diagram form a telecommunication system according to the invention comprising access systems according to the invention with servers according to the invention and with translating sections according to the invention.

FIG. 1 illustrates a telecommunication system according to the invention comprising a first access system 1 according to the invention with a server 14 according to the invention and with translating sections 11,12 according to the invention and a second access system 2 possibly also according to the invention. First access system 1 is coupled to first terminals 3,4,5 and to second access system 2, which is further coupled via base stations to second terminals 6,7,8. First terminals 3,4,5 are fixed terminals, but could also be cordless or mobile terminals communicating with access system 1 via base stations etc. Second terminals 6,7,8 are mobile terminals, but could also be fixed or cordless terminals. Further units like for example local switches, routers, bridges, servers, base stations, nodes etc. between (first/second) terminals and (first/second) access systems and between first and second access system may be present and are therefore not to be excluded.

First access system 1 comprises a coupler 10 coupled to said first terminals 3,4,5, to second access system 2, to first translating section 11 and to second translating section 12, to buffer 13 and to server 14. Server 14 comprises a controller 20 coupled to coupler 10, to generating section 21, to replacing section 22 and adding section 23, to activating section 24 and activating section 25, to first detecting section 26 and to second detecting section 27, to a control in/output of both translating sections 11,12 and to a control in/output of buffer 13. First detecting section 26 is also coupled to said control in/output of buffer 13, and second detecting section 27 is also coupled to said control in/output of both translating sections 11,12. Replacing section 22 and adding section 23 are further coupled to a data in/output of buffer 13 and to generating section 21, and activating section 24 and activating section 25 are further coupled to an activation in/output of both translating sections 11,12 and to generating section 21. Translating sections 11,12 together form a gateway 15, which is further coupled to second access system 2.

A prior art telecommunication system comprises a first access system 1 for first communication with a first terminal 3,4,5 and a second access system 2 coupled to said first access system 1 for second communication with a second terminal 6,7,8, which first communication comprises first packets comprising addresses of a first kind and which second communication comprises either first packets comprising addresses of a first kind second packets comprising addresses of a second kind.

Such a prior art telecommunication system is for example a telecommunication network, with said first access system for example being a public access network and with said second access network for example being a private access network.

This prior art telecommunication system is generally known, with said addresses of a first kind defining public addresses used in the first communication based upon the exchanging of first packets and with said addresses of a second kind defining private addresses used in the second communication based upon the exchanging of second packets. These addresses all have the same length, and need to pass, in a set-up phase as well as in a communication phase, a gateway located between said access systems.

The known telecommunication system is disadvantageous, inter alia, due to not being able to handle addresses with different lengths, and/or due to needing a gateway for the set-up phase as well as for the communication phase.

It is an object of the invention, inter alia, of providing a telecommunication system as defined in the preamble which can handle different addresses with different lengths and/or which can handle different addresses of different kinds based upon different protocols, without the set-up phase getting inefficient.

The telecommunication system according to the invention is characterised in that said first communication is in accordance with a first protocol and said second communication is in accordance with said first protocol or a second protocol, with addresses of a first kind having a first length and with addresses of a second kind having a second length smaller than said first length, and with said first access system 1 comprising a generating section 21 for, in response to an address of one kind, generating a corresponding address of an other kind for a terminal-to-terminal communication comprising said first and second communication and independently of which terminal has initiated said terminal-to-terminal communication.

By introducing said generating section 21 in said first access system 1, in other words in that part of the telecommunication system which deals with the most sophisticated (first) terminals 3,4,5 of the two kinds of terminals involved (the other second terminal is less sophisticated or at most similarly sophisticated—here both options are still open), due to these first terminals 3,4,5 communicating via the first packets comprising more sophisticated, longer addresses (of a first kind) based upon the first, more sophisticated protocol and due to the second terminals 6,7,8 communicating either via the first packets comprising more sophisticated, longer addresses (of a first kind) based upon the first, more sophisticated protocol or via the second packets comprising less sophisticated, shorter addresses (of a second kind) based upon the second, less sophisticated protocol (here both options are still open), the telecommunication system according to the invention can handle the entire set-up phase as well as the entire communication phase from one location (the first access system 1), due to, at this location, a relationship between said addresses of said first and second kind being available, independently of which terminal has initiated said terminal-to-terminal communication. As a result, for the set-up phase, a gateway no longer is necessary, and both access systems can operate with the highest speed and/or with optimal efficiency.

A first embodiment of the telecommunication system according to the invention is advantageous in that, for a set-up phase, said first access system 1 comprises a replacing section 22 coupled to said generating section 21 for, in response to a receival of a set-up message comprising an address of a second kind and originating from one of said second terminals 6,7,8, replacing said address of a second kind by a corresponding address of a first kind.

By introducing said replacing section 21, set-up messages originating from the second, less sophisticated terminals 6,7,8 can now be used for setting up a communication from the second, less sophisticated terminals 6,7,8 to the first, more sophisticated terminals 3,4,5. When setting up a communication from a second, less sophisticated terminal 6,7,8 to a first terminal 3,4,5, at the moment of arrival of said set-up message at said first access system 1, the second terminal 6,7,8 is identified. And each (first/second) access system 1/2 has knowledge about the (first/second) terminals 3,4,5/6,7,8 coupled to this (first/second) access system 1/2. So, at said moment of arrival, everything is clear, the first access system 1 has identified the second terminal 6,7,8 and already knows the first terminal 3,4,5.

A second embodiment of the telecommunication system according to the invention is advantageous in that said first access system 1 comprises an activating section 24 for activating a first translating section 11 for a communication phase.

By introducing said activating section 24, for the communication phase following said set-up phase, said first translating section 11 can be activated for a more fluent communication.

A third embodiment of the telecommunication system according to the invention is advantageous in that, for a communication phase, said first access system 1 comprises said first translating section 11 coupled to said generating section 21 for, in response to a receival of a second packet, translating an address of a second kind into an address of a first kind.

By translating addresses of a second kind into addresses of a first kind, said second packets originating from said second terminal 6,7,8 can now be forwarded to said first terminal 3,4,5.

A fourth embodiment of the telecommunication system according to the invention is advantageous in that, for a set-up phase, said first access system 1 comprises an adding section 23 coupled to said generating section 21 for, in response to a receival of a set-up message comprising an address of a first kind and originating from said first terminal 3,4,5, adding, in addition to said address of a first kind, a corresponding address of a second kind, with an amended set-up message comprising both said address of said first kind and said address of second kind to be sent to said second access system 2.

By introducing said adding section 23, set-up messages originating from the first, more sophisticated terminal 3,4,5 can now be used for setting up a communication from the first, more sophisticated terminal 3,4,5 to the second, still unknown terminal 6,7,8. When setting up a communication from the first, more sophisticated terminal 3,4,5 to the second terminal 6,7,8, at the moment of arrival of said set-up message at said first access system 1, the first terminal 3,4,5 is identified. But each (first/second) access system 1/2 has already knowledge about the (first/second) terminals 3,4,5/6,7,8 coupled to this (first/second) access system 1/2. So, at said moment of arrival, not everything is clear yet, the first access system 1 has just identified the already known first terminal 3,4,5, but does not yet know enough about the second terminal 6,7,8.

A fifth embodiment of the telecommunication system according to the invention is advantageous in that said first access system 1 comprises an activating section 25 for, in response to a response message comprising said address of said second kind and originating from said second access system 2, activating a second translating section 12 for a communication phase.

By introducing said activating section 25, for the communication phase following said set-up phase, said second translating section 12 can be activated for a more fluent communication. Contrary to the activation of the first translating section 11, the activation of the second translating section 12 can only be done after said second terminal 6,7,8 has been identified by said first access system 1. This identification is done through said response message.

A sixth embodiment of the telecommunication system according to the invention is advantageous in that, for a communication phase, said first access system 1 comprises said second translating section 12 coupled to said generating section 21 for, in response to a receival of a first packet, translating an address of a first kind into an address of a second kind.

By translating addresses of a first kind into addresses of a second kind, said first packets originating from said first terminal 3,4,5 can now be forwarded to said second terminal 6,7,8.

A seventh embodiment of the telecommunication system according to the invention is advantageous in that said first and second protocol respectively are more recent and less recent versions respectively of an Internet Protocol, with said first length being 128 bits and with said second length being 32 bits, with said generating section 21, replacing section 22, adding section 23 and activation sections 24,25 forming part of a Session Initiation Protocol Server 14, and with said first and second translating sections 11,12 forming part of a gateway.

Said more recent version for example corresponds with IPv6, and said less recent version for example corresponds with IPv4. Said sections can be 100% hardware, 100% software or a mixture of both running via one or more processors of said Session Initiation Protocol (SIP) Server and/or of said gateway 15.

The invention is based upon an insight, inter alia, that when a relationship between addresses having the same length can be defined, it should also be possible to define a relationship between addresses having different lengths, and is based upon a basic idea, inter alia, that such a relationship should be defined at a location situated closest to the most sophisticated (first) terminal of the two terminals involved (in other words closest to the terminal communicating in accordance with the most sophisticated protocol).

The invention solves the problem, inter alia, of providing a telecommunication system as defined in the preamble which can handle different addresses with different lengths (of different kinds), with addresses of a first kind being used for the first communication in accordance with the first protocol and with addresses of the second kind being used for the second communication in accordance with the second protocol, and without requiring, in the set-up phase, a gateway. Usually, in the communication phase, a (kind of) gateway will still be required.

It should be noted that said first and second protocols can be two different protocols, or can be different versions of the same protocol. The fact that the first communication comprises first packets comprising addresses of a first kind and that the second communication comprises second packets comprising addresses of a second kind can correspond with one or both kinds of terminals generating these packets, or can correspond with further units (like for example local switches, routers, bridges, servers, and/or base stations, nodes etc.) taking care of a conversion of terminal signals into packets. Said terminals 3-8 can be fixed terminals, cordless terminals, mobile terminals, satellite terminals etc.

It should further be noted that a gateway for generating, in response to an address of one kind, a corresponding address of an other kind, is known from "Network Address Translation—Protocol Translation (NAT-PT)", Network Working Group—Request for Comments: 2766—Category: Standards Track, G. Tsirtsis, B T, P. Srisuresh, Campio Communications, February 2000. However, such a gateway reduces the efficiency of the set-up phase a lot. The invention comprises a solution, which does not require a gateway for the set-up phase, with said generating section being located in said first access system only, and not in said second access system (for the case where said first terminal is most sophisticated and where said second terminal is less sophisticated), independently of which terminal has initiated said terminal-to-terminal communication.

Figure 2:
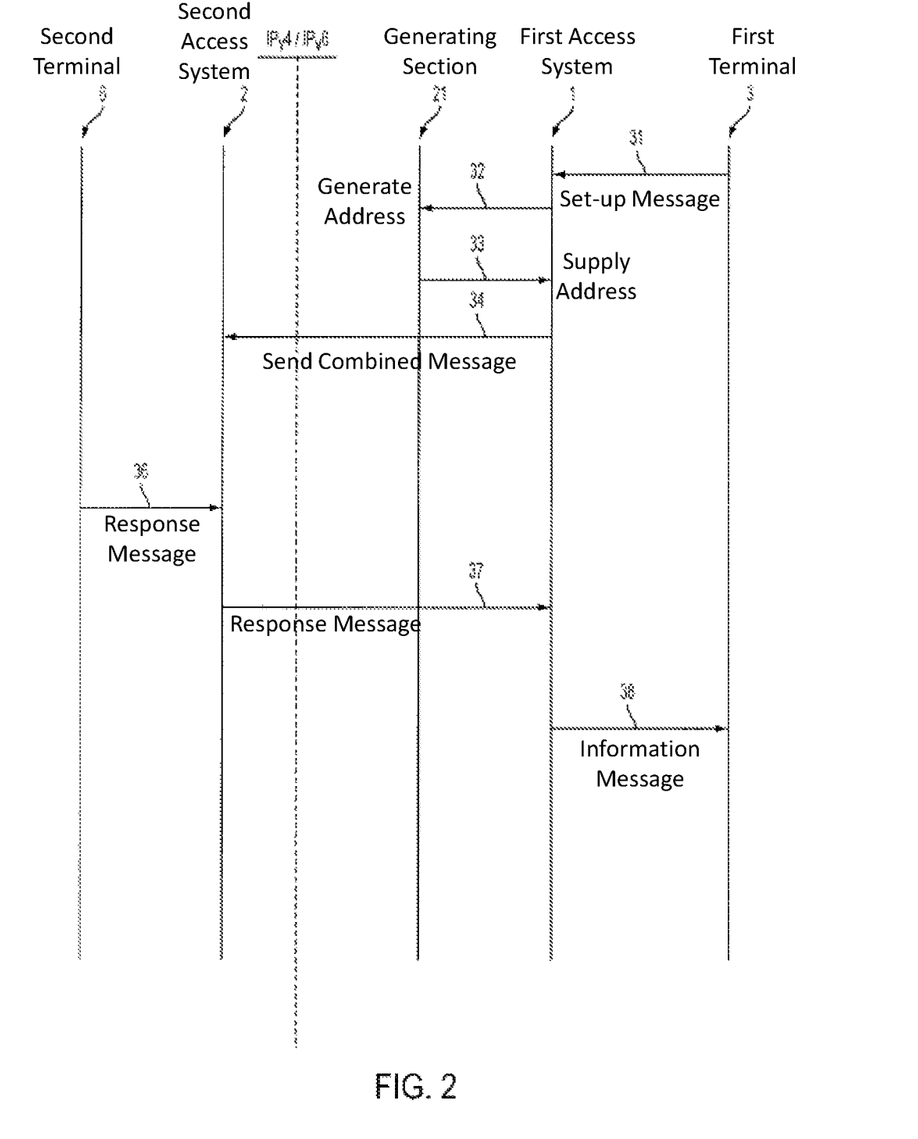
FIG. 2 illustrates a diagram of messaging between components of the system when initiated by an IPv6 terminal.

Chronologically, in case first terminal 3 wishes to communicate with second terminal 6, as shown in FIGS. 1 and 2, the following happens (terminal-to-terminal communication with first terminal 3 being the initiating one). First terminal 3 generates a set-up message comprising an address of a first kind of 128 bits and defining said first terminal 3 and comprising a further address for example in the form of an SIP—Unified Resource Identifier or SIP-URI defining second terminal 6. This set-up message (message 31) arrives at coupler 10 of first access system 1, and is, under control of controller 20, supplied to buffer 13, after which said set-up message, under control of controller 20, is detected by first detecting section 26. Controller 20 is informed of the detection result and finds out that said set-up message is to be sent via second access system 2 to second terminal 6 as defined by said SIP-URI. Due to controller 20 not knowing whether second terminal 6 communicates according to the first or second protocol, controller 20 instructs (message 32) generating section 21 to generate an address of a second kind of 32 bits (like for example an IPv4 address defining translating section 12) and corresponding to said address of said first kind (like for example an IPv6 address defining first terminal 3), which address of said second kind is supplied (message 33) to adding section 23. A corresponding address here means that, in this case, first access system 1 is identified either, in case of second terminal 6 being also IPv6, by said address of said first kind for example being an IPv6 address defining first terminal 3, or, in case of second terminal 6 being IPv4, by said corresponding address of said second kind for example being an IPv4 address defining translating section 12. So, the corresponding address here defines an interface between both terminals to be used in the communication phase. Under control of controller 20, said address of said second kind is added to said address of said first kind, and said set-up message stored in buffer 13 is amended correspondingly, and then sent (message 34) via coupler 10 to second access system 2. Second access system 2 knows that second terminal 6 communicates according to the second protocol, and second terminal 6 sends back a response message (messages 36, 37) via second access system 2 to first access system 1 to inform controller 20 about this. This response message just comprises an address of a second kind (like for example an IPv4 address defining second terminal 6) and does not comprise an address of a first kind, and is stored in buffer 13 via coupler 10. Said response message, under control of controller 20, is detected by first detecting section 26. Controller 20 is informed of the detection result and finds out that said second terminal 6 communicates according to the second protocol. In response, controller 20 instructs activating section 25 to activate second translating section 12, and sends an information message to first terminal 3 to inform first terminal 3 that communication can be started and to inform first terminal 3 of an address of a first kind defining second translating section 12. As a result, in the communication phase, a first packet originating from first terminal 3 and arriving via coupler 10 is supplied to translating section 12, possibly further having some kind of buffer function. This first packet comprising the address of a first kind (like for example an IPv6 address defining translating section 12) is detected, under control of controller 20, by second detecting section 27, which informs controller 20 of a detection result. In response controller 20 instructs generating section 21 to generate the corresponding address of a second kind (like for example an IPv4 address defining second terminal 6), which via activating section 25 is supplied to second translating section 12. Second translating section 12 replaces said address of a first kind by said corresponding address of a second kind, after which an amended first packet is sent directly to second access system 2.

In case of translating section 12 having said buffer function and having a further detection function, all further first packets, in this particular communication and originating from first terminal 3, can now automatically be amended, without server 14 being further involved, resulting in a very fluent communication between both terminals.

Alternatively, and/or in addition, when activating said second translating section, in other words before said first packet has arrived, said second translating section can be informed already of said corresponding address of a second kind. In this case, it is further possible that, in the communication phase, said first packets are all dealt with, without server 14 (and preferably buffer 13) being involved at all. This is a very advantageous embodiment due to said set-up phase and said communication phase being completely separated from each other and each being most fluently dealt with.

Further alternatively, and/or further in addition, said first packet can be dealt with via buffer 13, with following first packets being dealt with via translating section 12.

Figure 3:
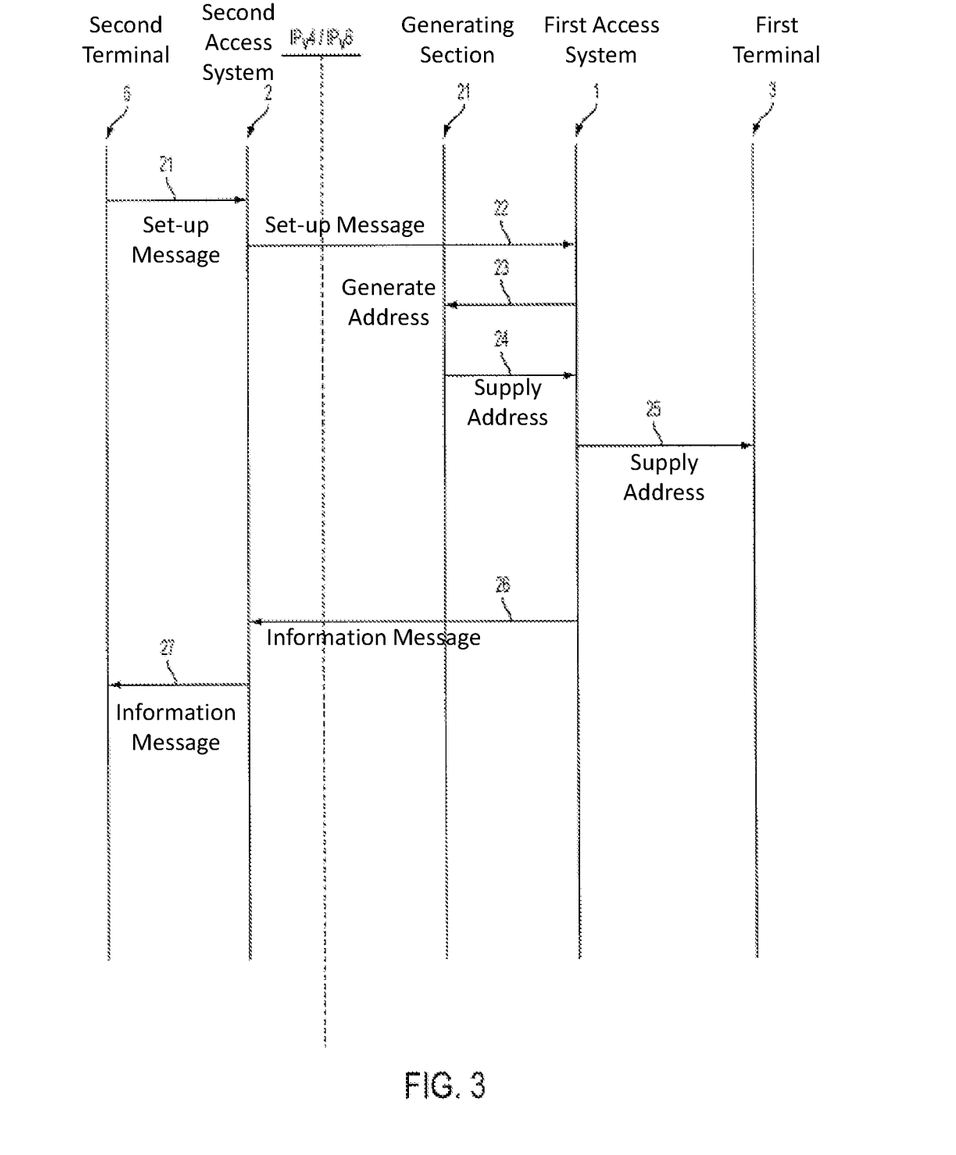
FIG. 3 illustrates a diagram of messaging between components of the system when initiated by an IPv4 terminal.

Chronologically, in case second terminal 6 wishes to communicate with first terminal 3, as shown in FIGS. 1 and 3, the following happens (terminal-to-terminal communication with second terminal 6 being the initiating one). Second terminal 6 generates a set-up message comprising an address of a second kind of 32 bits and defining said second terminal 6 and comprising a further address for example in the form of an SIP-URI defining first terminal 3. This set-up message (messages 21, 22) arrives via second access system 2 at coupler 10 of first access system 1, and is, under control of controller 20, supplied to buffer 13, after which said set-up message, under control of controller 20, is detected by first detecting section 26. Controller 20 is informed of the detection result and finds out that said set-up message is to be sent to first terminal 3 as defined by said SIP-URI. Due to controller 20 already knowing that first terminal 3 communicates according to the first protocol, controller 20 instructs (message 23) generating section 21 to generate an address of a first kind of 128 bits (like for example an IPv6 address defining translating section 11) and corresponding to said address of said second kind, which address of said first kind is supplied (message 24) to replacing section 22. A corresponding address here means that, in this case, first terminal 3 will identify second terminal 6 not via said address of said second kind defining second terminal 6 but via said corresponding address of said first kind defining translating section 11. So, the corresponding address here defines an interface between both terminals to be used in the communication phase. Under control of controller 20, said address of said second kind is replaced by said address of said first kind, and said set-up message stored in buffer 13 is amended correspondingly, and then sent (message 25) via coupler 10 to first terminal 3. Due to first access system 1 already being informed via said address of said second kind (like for example an IPv4 address defining second terminal 6) that second terminal 6 communicates according to the second protocol, this time a response message is not required, at least not for finding out according to which protocol said second terminal 6 communicates. In response, controller 20 instructs activating section 24 to activate first translating section 11, and sends an information message (messages 26, 27) to second terminal 6 to inform second terminal 6 that communication can be started and to inform second terminal 6 of an address of a second kind defining first translating section 11. As a result, a second packet originating from second terminal 6 arrives at translating section 11, possibly further having some kind of buffer function. This second packet comprising the address of a second kind (like for example an IPv4 address defining first translating section 11) is detected, under control of controller 20, by second detecting section 27, which informs controller 20 of a detection result. In response controller 20 instructs generating section 21 to generate the corresponding address of a first kind (like for example an IPv6 address defining first terminal 3), which via activating section 24 is supplied to first translating section 11. First translating section 11 replaces said address of a second kind by said corresponding address of a first kind, after which an amended second packet is sent via coupler 10 to first terminal 3.

In case of translating section 11 having said buffer function and having a further detection function, all further second packets, in this particular communication and originating from second terminal 6, can now automatically be amended, without server 14 being further involved, resulting in a very fluent communication between both terminals.

Alternatively, and/or in addition, when activating said first translating section, in other words before said second packet has arrived, said first translating section can be informed already of said corresponding address of a first kind. In this case, it is further possible that, in the communication phase, said second packets are all dealt with, without server 14 (and preferably buffer 13) being involved at all. This is a very advantageous embodiment due to said set-up phase and said communication phase being completely separated from each other and each being most fluently dealt with.

Further alternatively, and/or further in addition, said second packet can be dealt with via buffer 13, with following second packets being dealt with via translating section 11.

For both chronological communications described above, either the same translating section can be used for translating the addresses of the other kind flowing into the other direction, or the other translating section can be used for this purpose.

Each block shown or not shown, can be 100% hardware, 100% software or a mixture of both. Each block shown or not shown can be integrated with each other block shown and/or not shown. Buffer 13 could for example form part of server 14. Especially in server 14, controller 20 can be a processor, with one or more of said generating section 21, replacing section 22, adding section 23, activating sections 24,25, and/ or detecting sections 26,27 being implemented in the form of software. Or, in server 14, controller 20 can be a processor, with one or more of said sections comprising a subprocessor and/or a buffer. Gateway 15 comprising said translating sections 11,12 can be a processor comprising software, possible together with a buffer or a buffering function and a detector or a detecting function. Alternatively, gateway 15 may comprise shift registers and comparators for comparing contents of said shift registers with predefined contents and in dependence of comparison results replacing contents of said shift registers by other contents, etc., with for example controller 20 taking care of supplying said predefined contents and/or other contents, once per communication or more regularly.

The invention claimed is:

1. A method for setting up communication between a first terminal using a first protocol and a second terminal using a third protocol, said first protocol using packets having sizes smaller than the packets of said third protocol, the method comprising:

if receiving a communication request from said first terminal requesting communication with said second terminal, said request comprising a first protocol first terminal address and a second protocol second terminal address, providing said first protocol first terminal address to a generating section, to request a corresponding third protocol first terminal address, providing said third protocol first terminal address, to said second terminal, providing a third protocol second terminal address to said generating section to request a corresponding first protocol second terminal address, and providing said first protocol second terminal address to said first terminal; and if receiving a communication request from said second terminal requesting communication with said first terminal, said request comprising a third protocol second terminal address and a second protocol first terminal address, providing said third protocol second terminal address to said generating section, to request a corresponding first protocol second terminal address, providing said third protocol second terminal address and said first protocol second terminal address to an access server coupled to said first terminal, receiving a message from said first terminal comprising said first protocol first terminal address, providing said first protocol first terminal address to said generating section, to request a corresponding third protocol first terminal address, and providing said corresponding third protocol first terminal address to said second terminal.

2. The method of claim 1, further comprising:

if receiving a communication request from said first terminal requesting communication with said second terminal, said request comprising a first protocol first terminal address and a second protocol second terminal address, receiving a third protocol first terminal address corresponding to said first protocol first terminal address from said generating section; and if receiving a communication request from said second terminal requesting communication with said first terminal, said request comprising a third protocol second terminal address and a second protocol first terminal address, receiving a first protocol second terminal address corresponding to said third protocol second terminal address from said generating section.

\* \* \* \* \*